(12) United States Patent
Amir (10) Patent No.: US 11,436,459 B2
(45) Date of Patent: Sep. 6, 2022

(54) COMBINATION OF IMAGE AND MACHINE READABLE GRAPHIC CODE

(71) Applicant: Hewlett-Packard Development Company, L.P., Spring, TX (US)

(72) Inventor: Gideon Amir, Ness Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/051,112

(22) PCT Filed: Aug. 7, 2018

(86) PCT No.: PCT/US2018/045565
§ 371 (c)(1),
(2) Date: Oct. 27, 2020

(87) PCT Pub. No.: WO2020/032930
PCT Pub. Date: Feb. 13, 2020

(65) Prior Publication Data
US 2021/0232881 A1    Jul. 29, 2021

(51) Int. Cl.
*G06K 19/06* (2006.01)
(52) U.S. Cl.
CPC ............................. *G06K 19/06103* (2013.01)
(58) Field of Classification Search
CPC .............................................. G06K 19/06103
(Continued)

(56) References Cited

U.S. PATENT DOCUMENTS 8,144,922 B2 * 3/2012 Kawabe ............ G06K 19/06037
382/100
10,817,971 B2 * 10/2020 Arce ...................... G06T 5/004
(Continued)

FOREIGN PATENT DOCUMENTS

CN           106778996        5/2017
WO      WO-2018061232        4/2018

OTHER PUBLICATIONS

Gaikwad, A. M. et al. "Embedding QR Code in Color Images using Half toning Technique" (2015) IEEE Sponsored 2nd International Conference on Innovations in Information Embedded and Communication Systems, 6 pages.

*Primary Examiner* — Paultep Savusdiphol
(74) *Attorney, Agent, or Firm* — Michael A Dryja (57) ABSTRACT

A method comprises providing to a processor or generating by the processor, an image, and a machine readable graphic code comprising a plurality of light pixels and a plurality of dark pixels. The processor determines whether the image and machine readable code are the same size if they are not the same size, scales or crops the image or the machine readable code such that they are the same size. The processor associates each graphic code pixel with a corresponding image pixel, each pixel having a lightness value. The processor determines for each image pixel, based on a comparison between a lightness of the image pixel and a lightness of a corresponding graphic code pixel, whether to adjust the lightness of the image pixel based on one of a low threshold lightness value and a high threshold lightness value. The lightness value is adjusted for each pixel of the image which is to be adjusted to a modified lightness value, such that a combination of the image and the graphic code is produced.

15 Claims, 4 Drawing Sheets

(58) Field of Classification Search
USPC .......................................................... 235/494
See application file for complete search history.

(56) References Cited

U.S. PATENT DOCUMENTS

| | | | |
|---|---|---|---|
| 2013/0021364 A1* | 1/2013 | Azuma | G06K 19/06037 |
| | | | 345/589 |
| 2013/0026239 A1* | 1/2013 | Sakahashi | G06K 19/06056 |
| | | | 235/494 |
| 2013/0026241 A1* | 1/2013 | Sakahashi | G06K 19/06037 |
| | | | 235/494 |
| 2013/0112760 A1* | 5/2013 | Schory | G06K 19/06112 |
| | | | 235/494 |
| 2013/0221105 A1* | 8/2013 | Cheong | G06K 7/1443 |
| | | | 235/469 |
| 2014/0144996 A1* | 5/2014 | Friedman | G06K 19/06037 |
| | | | 235/494 |
| 2015/0324946 A1* | 11/2015 | Arce | G06T 5/004 |
| | | | 382/251 |
| 2018/0075570 A1* | 3/2018 | Arce | G06T 11/001 |
| 2018/0131976 A1 | 5/2018 | Zabelin | |

\* cited by examiner

COMBINATION OF IMAGE AND MACHINE READABLE GRAPHIC CODE

BACKGROUND

Machine readable graphic codes are representations of data which are readable by a machine via optical means. Examples of machine readable graphic codes are one-dimensional barcodes, and two-dimensional barcodes.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Machine readable graphic codes optically represent data for reading by a device, such as a barcode scanner, or a camera in combination with a processor comprising a suitable program for decoding the code. In some examples, a machine readable graphic code may be printed onto a print medium and affixed to an item. The code may encode information about the item to which it is affixed. A machine readable code may in some examples be displayed by a display device, such as a computer monitor or smartphone screen to be optically read by another device.

In examples, machine readable graphic codes comprise a plurality of light areas and a plurality of dark areas. The information encoded by the code is contained in the positioning of the light areas and the dark areas. Such machine graphic codes may be referred to as binary machine readable graphic codes. Example types of machine readable codes are one-dimensional, 1D, barcodes, and two-dimensional, 2D, barcodes. 2D barcodes may also be referred to as matrix codes. In a 1D barcode, the information is encoded in the thickness and spacing between parallel lines, which are separated by white lines. A machine readable code may also in some examples contain optical representations of numbers, for example as Arabic numerals. For example, a Universal Product Code, UPC, barcode may comprise optically represented numerals. An example 2D barcode may represent data via a plurality of areas which may be rectangles, dots, hexagons, and/or other geometric patterns. In an example, a 2D barcode, or matrix code, may comprise a plurality of black areas separated by a plurality of white areas, wherein the information encoded by the code is determinable from the shaping and the spacing of the areas. An example of a 2D barcode is a Quick Response, QR code. Other examples of 2D barcodes are Data Matrix codes and DotCodes. A machine readable code may comprise a plurality of positioning features, for example a QR code may comprise one positioning feature in each of three corners of a 2D code having four corners, in order to provide an alignment calibration to a machine reading the code. A graphic code may comprise error correction features, such as redundant information-carrying areas of the code, which act to correct errors in reading the code should other areas of the code be unreadable. The providing of error correction features may allow for areas of a generated code to be omitted or modified without rendering the code unreadable.

Figure 1A:
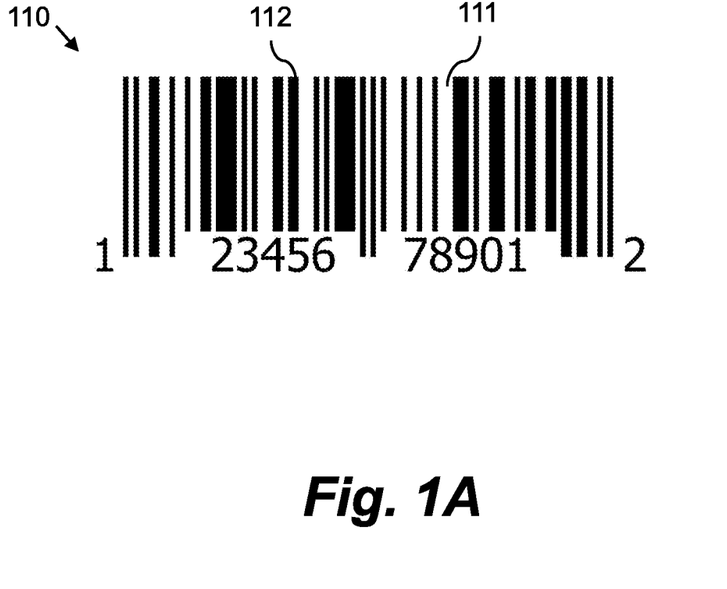
FIG. 1A shows an example machine readable graphic code to be combined with an image according to an example method.
Figure 1B:
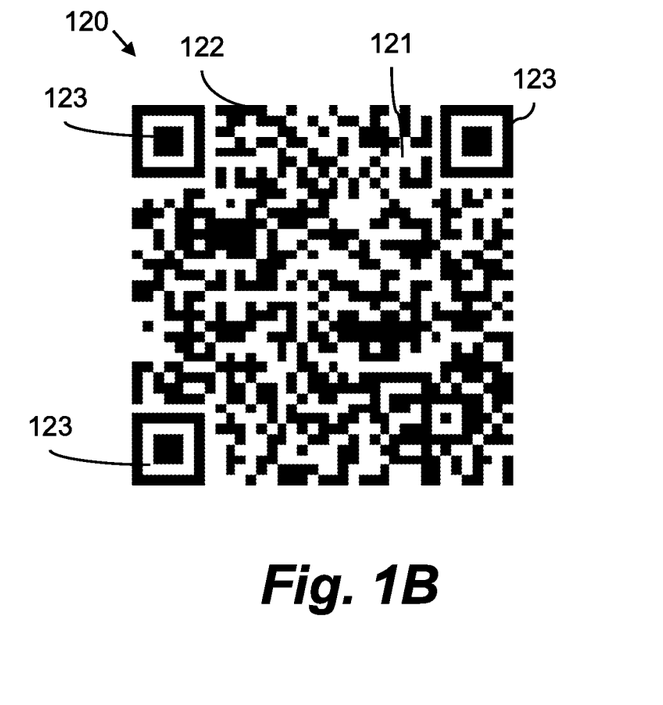
FIG. 1B shows another example machine readable graphic code to be combined with an image according to an example method.

FIG. 1A shows a first example machine readable graphic code 110. The graphic code shown in FIG. 1B is a 1D barcode comprising a plurality of parallel black lines 112 comprising black pixels and a plurality of white spaces 111 comprising white pixels. Example methods described herein may be used to combine an example machine readable graphic code such as that shown in FIG. 1A with an image (not shown).

FIG. 1B shows a second example machine readable graphic code 120. The graphic code shown in FIG. 1B is a 2D code, namely a QR code, comprising a plurality of white areas 121 comprising light pixels and a plurality of black areas 122 comprising black pixels. The graphic code 120 in this example encodes a hyperlink to https://www8.hp.com/us/en/home.html. The graphic code 120 has been generated with an error correction level of 30%. The graphic code 120 comprises a plurality of alignment features 123. In examples, the machine readable graphic code may be generated with an error correction level taking into account readability of the combination of the code and image. For example, the error correction level may be set taking into account the contrast which will be set in the resulting modified combination of code and image. Example methods described herein may be used to combine an example machine readable graphic code such as that shown in FIG. 1B with an image (not shown).

As mentioned above, machine readable graphic codes may comprise a plurality of light, or white, areas, and a plurality of dark, or black, areas. Since a machine graphic code is displayed optically, it can be visible to a user, for example when affixed to a product, or displayed on a device display. Example methods herein provide for a machine readable graphic code to be combined with an image to produce a combination of the image and the graphic code which displays visual characteristics of an image to a user, while allowing the code to be read by a machine. Example methods described herein use the same image for both the light areas and the dark areas of the machine readable graphic code. As such, features of the image are preserved across the entirety of the resulting combination, which may result in good visual perception of the image by the user in the resulting combination of image and graphic code. It should be noted that in examples described herein, the combination of graphic code and image may also be referred to as a modified image.

Figure 2:
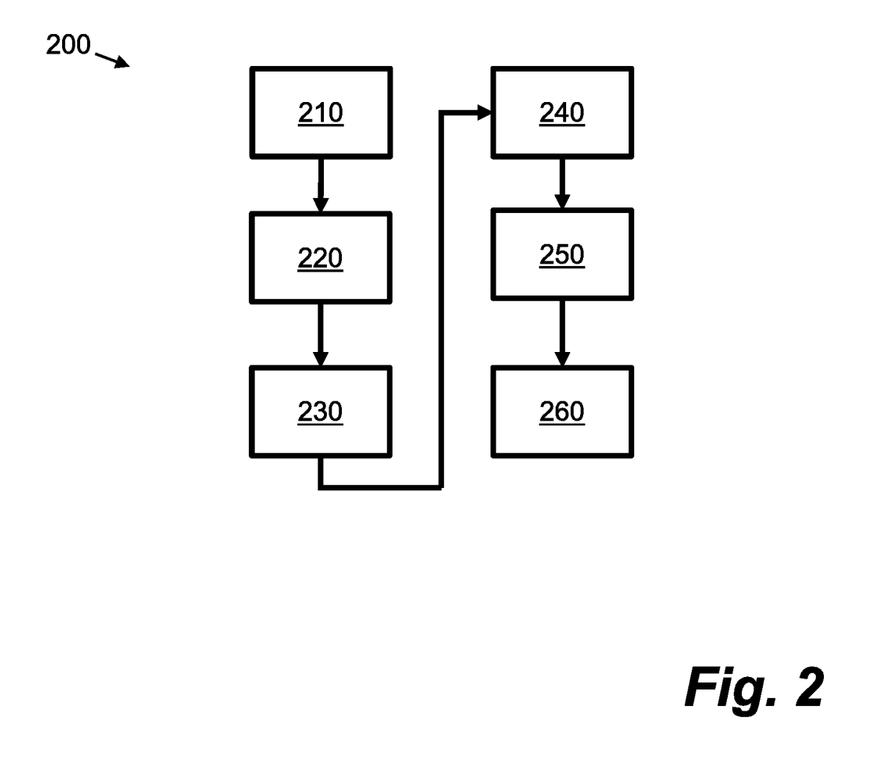
FIG. 2 shows a schematic flow chart representation of an example method.

FIG. 2 shows a flow chart representation of an example method 200 comprising: at block 210, providing, to a processor, or generating by the processor, an image file. In examples, the image file may represent an image in any suitable file format, such as GIF, PNG, TIFF, JPEG; at any color mode such as RGB or CMYK. The image may be provided to the processor from any suitable machine readable medium. At block 220, the method 200 comprises providing, to the processor, or generating by the processor, a machine readable graphic code comprising a plurality of light pixels and a plurality of dark pixels. Light pixels of the graphic code will be referred to herein as white graphic code pixels and dark pixels of the graphic code will be referred to herein as black graphic code pixels. The machine readable graphic code is a representation which may be read optically by a computer. The machine readable code may be a one-dimensional, 1D, graphic code, such as a 1D barcode, such as a Universal Product Code, UPC, barcode. In other examples, the machine readable code is a two-dimensional, 2D, graphic code, such as a 2D barcode, such as a Quick Response code, i.e. QR code. The machine readable graphic code may be provided to the processor in any suitable format, for example any format suitable for encoding an image. In examples the machine readable graphic code is provided in lossless format encoded as, for example, GIF, PNG, TIFF or another suitable format. The abovementioned file can be encoded as a binary image, e.g. black and white, or in a color format using any color mode such as RGB or CMYK.

At block 230, the method 200 comprises determining, using the processor, if the image is the same size as the graphic code, and if the image is not the same size as the graphic code, scaling or cropping the image or the graphic code to make the image the same size as the graphic code. In examples, at least a portion of the image is sized to the machine readable graphic code. For example, the combination of the image and the machine readable graphic code may be produced by changing the number of pixels of the image to match the number of pixels of the graphic code. Changing of the number of pixels of the image may be done by, for example, rescaling the image, or cropping the image. At block 240, the method 200 comprises associating, by the processor, each pixel of the machine readable graphic code with a corresponding pixel of the image, wherein each image pixel has a lightness. In examples, each pixel of the machine readable graphic code is associated with the image once the image has been resized to the size of the graphic code, if the image is resized. For example, if the graphic code and the image provided to/by the processor are the same size, for example comprising the same number of pixels, then in example methods no resizing may take place. As referred to herein, the term image pixel refers to a pixel of the image after any resizing has been done such that each image pixel is associated with a graphic code pixel.

In examples, the image is converted to a format having a lightness value, or a luminance value. In other examples, the image may be generated by or provided to the processor in a format having a lightness value. An example image format having a lightness value is Hue, Saturation, Lightness, HSL, format. Lightness may also be referred to as luminance. In examples of HSL used herein, lightness takes a value between and inclusive of 0, corresponding to black, and 1, corresponding to white. Hue may be considered to be the value which defines how an area appears to be similar to one of the perceived colors, e.g. a degree on a color wheel. Saturation can be considered to be the colorfulness of an area relative to its own brightness where when saturation is between 0 and 1 inclusive, a saturation of 0 is a shade of gray and a saturation of 1 is full-color. In some examples, the method comprises converting the image from RGB format to HSL format.

At block 250, the method 200 comprises determining, by the processor, for each pixel of the image based on a comparison between the lightness of the pixel of the image and a lightness of the corresponding pixel of the graphic code, whether to adjust the lightness of the image pixel based on one of a low threshold lightness value and a high threshold lightness value. In examples, determining for each pixel of the image based whether to adjust the lightness of the image pixel comprises: associating one of the lightness threshold values with the dark graphic code pixels and associating the other of the lightness threshold values with the light graphic code pixels, and: for an image pixel associated with a dark graphic code pixel, comparing the lightness of the image pixel to the associated lightness threshold value associated with the dark graphic code pixels, and adjusting the lightness of the image pixel or leaving the lightness of the image pixel unchanged based on a comparison between the lightness of the image pixel and the associated lightness threshold value; and for an image pixel associated with a light graphic code pixel, comparing the lightness of the image pixel to the threshold value associated with the light graphic code pixels, and adjusting the lightness of the image pixel or leaving the lightness of the image pixel unchanged based on a comparison between the lightness of the image pixel and the associated lightness threshold value.

In examples, the method at block 250 comprises, for each image pixel, determining whether the associated graphic code pixel is white or black. In such examples, where the associated graphic code pixel is black, the lightness of the image pixel is compared to the low threshold lightness value. Where the associated graphic code pixel is white, the lightness of the image pixel is compared to the high threshold lightness value. One example method comprises determining for each image pixel whether the image pixel is associated with a light graphic code pixel or a dark graphic code pixel and associating the image pixel with one of two lightness threshold values based on whether the image pixel is associated with a light graphic code pixel or a dark graphic code pixel At block 260, the method 200 comprises adjusting, by the processor, the lightness value for each pixel of the image which is to be adjusted to a modified lightness value, such that a combination of the image and the graphic code is produced. In examples, adjusting the lightness of an image pixel, at block 260, comprises adjusting the lightness of the image pixel to the threshold lightness value associated with the image pixel. In examples, adjusting the lightness of an image pixel comprises adjusting the lightness of the image pixel towards the lightness threshold associated with the image pixel, by the lesser of: the difference between the image pixel lightness and the associated threshold lightness, and a predetermined value, as will be discussed in more detail below. One example method comprises determining a modification to the lightness of each image pixel based on a comparison between the lightness of the image pixel and the lightness threshold value associated with the image pixel and making the determined modification to the lightness of each image pixel.

In examples, the method comprises for each white pixel of the machine readable graphic code, comparing the lightness value of the image pixel to the high threshold lightness value, and: leaving the lightness value of the image pixel unchanged where the lightness value of the image pixel is greater than or equal to the high threshold lightness value, and increasing the lightness value of the pixel of the image to a modified lightness value where the lightness value of the image pixel is less than the high threshold lightness value. In examples, the modified lightness value for an image pixel associated with a white graphic code pixel is equal to the high threshold lightness value. As such: if the image pixel lightness of the image pixel associated with a white graphic code pixel is less than the high lightness threshold, it is modified to the high lightness threshold; and if the image pixel lightness is greater than or equal to the high lightness threshold the lightness is left unchanged. In other examples, the lightness value of the image pixel is increased by the lesser of: the difference between the image pixel lightness and the high threshold lightness; and a predetermined maximum value. The predetermined maximum value may in some examples be the difference between the high lightness threshold and the low lightness threshold, which is termed herein—delta lightness. In such examples, the modified lightness value for an image pixel associated with a white graphic code pixel is equal to the image pixel lightness plus the predetermined value, e.g. image pixel lightness plus delta lightness.

In examples, the method at block 260 comprises, for each image pixel associated with a black pixel of the graphic code, comparing the lightness of the image pixel to the low threshold lightness value, and: leaving the lightness value of the image pixel unchanged where the lightness value of the image pixel is less than or equal to the low threshold lightness value, and decreasing the lightness value of the image pixel of the image to a modified lightness value where the lightness value of the image pixel is greater than the low threshold lightness value. In examples, the modified lightness value for an image pixel associated with a black graphic code pixel is equal to the low threshold lightness value. Similarly to as described for an image pixel associated with a white graphic code pixel, in other examples, when the lightness value of the image pixel is decreased, it is decreased by the lesser of: the difference between the image pixel lightness and the low threshold; and a predetermined maximum value, e.g. delta lightness. As such, in some examples, the modified lightness value for an image pixel associated with a black graphic code pixel is equal to the image pixel lightness minus the predetermined value, e.g. image pixel lightness minus delta lightness.

In examples, modifying the lightness values of pixels as described in the preceding paragraphs provides a version of the image which is modified based on the graphic code, such that the modified version of the image may be successfully read by a machine, to function to impart information encoded in the original graphic code. In example methods, by adjusting the lightness of pixels in the image, light areas and dark areas are produced in the modified image which correspond to the white areas and dark areas of the machine readable code. In examples, the values of the high threshold lightness value and the low threshold lightness value are predetermined to provide a suitable contrast between light areas and dark areas of the combined image and graphic code. The contrast may be set such that the combination of the image and the graphic code is readable as a graphic code by a machine. For example, where lightness takes values between 0 and 1 inclusive, the low threshold lightness value may be set at or around 0.3, for example between 0.2 and 0.4, while the high threshold lightness value may be set at or around 0.7, for example between 0.6 and 0.8. In examples, this allows the data encoded in the original graphic code to be read from the combination of image and graphic code.

In examples, a graphic code combined with an image according to example methods may comprise error correction features, as mentioned above. The error correction features may contribute to retaining readability of the information encoded by the graphic code from the modified image. For example, a greater error correction level present in the original graphic code may allow for lesser contrast in the modified image between the light and dark areas, which may allow a user to more easily perceive the image. A graphic code may be generated taking into account the image with which it is to be combined, and an error correction level may be set accordingly to allow the combined image and code to be read correctly. Adjusting the lightness value of pixels of the image based on the associated pixels of the graphic code allows the combined image and graphic code to be produced by making pixels lighter or darker without changing their color. As such, a single parameter, lightness, may be changed to make the adjustment to each pixel.

Example methods may further comprise converting the combination of image and graphic code into a different format, for example RGB or CMYK. As such, in some examples, the original image may be received in an RGB format, converted to HSL for the production of the combined graphic code and image, and the combined graphic code and image then converted to RGB. This may provide for compatibility with other programs and/or devices. In examples, the resulting combined graphic code and image may be displayed by a suitable display device, such as a smart phone screen or a computer monitor. In examples the resulting combined graphic code and image may be printed onto a medium.

Figure 3:
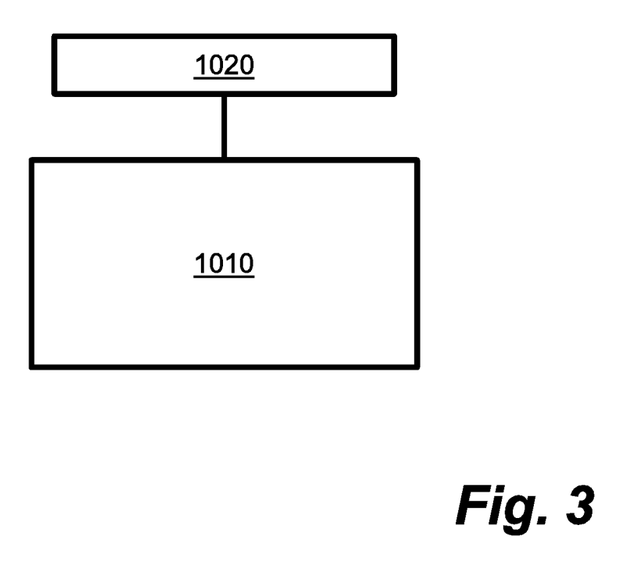
FIG. 3 shows a schematic representation of a machine readable medium and a processor for performing example methods described herein.

FIG. 3 shows a schematic representation of computer readable medium 1010 comprising a set of instructions which, in an example, when executed cause a processor 1020 to perform an example method described herein. In an example, the computer readable medium 1010 comprises a set of instructions which when executed cause the processor to perform a method as described with reference to FIG. 1, or an example method described below with reference to FIG. 3. In an example, the computer readable medium 1010, comprising a set of instructions which when executed by processor 1020 cause the processor 1020 to: receive or generate an image and a machine readable graphic code; scale the image and/or the graphic code to the same size such that each graphic code pixel is associated with an image pixel; convert the image to a format comprising a lightness value; determine whether to modify an image pixel based on a comparison between the image pixel and the graphic code pixel and a comparison between the lightness value of the image pixel and one of two threshold lightness values and modify the lightness of each image pixel according to the determination made to produce a combination of the image and the graphic code.

Figure 4:
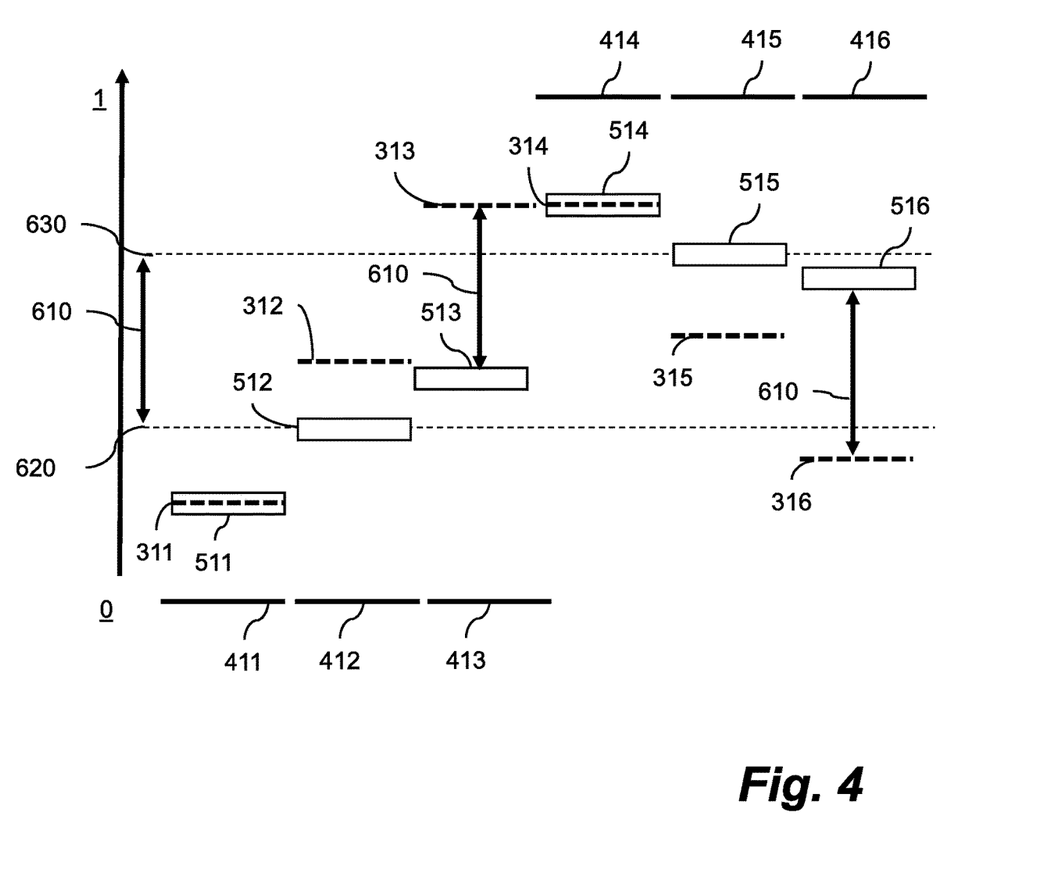
FIG. 4 shows a schematic graphical representation of features of an example method.

FIG. 4 shows a schematic representation of elements of an example method of producing a combination of a machine readable graphic code and an image, to be implemented by a processor, such as processor 1050. In FIG. 4, the vertical axis represents the magnitude of pixel lightness, wherein lightness has possible values between and including 0, corresponding to black, and 1, corresponding to white. Pixels of the image, machine readable graphic code, and the combination of the image and the graphic code are represented along the horizontal. Pixels of the machine readable graphic code are represented as solid lines 411-416, pixels of the image are represented by dashed lines 311-316, and pixels of the combination of the graphic code and the image are represented as blocks 511-516. Low threshold lightness value 620 and high threshold lightness value 630 are shown by dashed lines.

A portion of the graphic code is shown, in this example six pixels 411-416 are represented wherein first, second and third graphic code pixels 411-413 are black, having a lightness of 0, and fourth, fifth and sixth graphic code pixels 414-416 are white, having a lightness of 1. In the example method, the processor associates the first image pixel 311 with the first graphic code pixel 411, and determines that the first graphic code pixel 411 is associated with a black pixel. The lightness of first image pixel 311 is compared to the low threshold value 620 to determine whether the lightness of first image pixel 311 is below or equal to the low threshold value 620. In this case, it is determined that the lightness of the first image pixel 311 is below the low threshold value 620, and, since the first image pixel 311 is associated with black first pixel 411, the lightness value of the first image pixel 311 is left unchanged. The first graphic code and image combination pixel 511 therefore has a lightness value equal to that of the first pixel 311.

Continuing for the second image pixel 312, the second graphic code pixel 412, associated with the first image pixel 312, is black, therefore second image pixel 312 is compared to the low threshold 620. It is determined that the second image pixel 312 has a lightness greater than the low threshold 620, therefore a modification to the lightness value of the second image pixel 312 is made to produce the lightness value of the second combination pixel 512. In this example, the lightness of the second combination pixel 512 is set at the low threshold 620, since the associated graphic code pixel 412 is black and the image pixel lightness is greater than the low threshold 620.

The third image pixel 313 has a lightness greater than the low threshold 620 and is associated with a third graphic code pixel 413. Third graphic code pixel 413 is black. Therefore, the lightness of the third image pixel 313 is compared with the low threshold 620. In the case of third image pixel 313, it is determined that the lightness of image pixel 313 is greater than the low threshold 620. In some examples of the method described herein, in the case of a pixel such as third image pixel 313, i.e. where the lightness of an image pixel associated with a black graphic code pixel is found to be greater than the low threshold, the lightness of the associated combination pixel is set at the low threshold 620. However, in the example method shown by FIG. 4, since it is determined that the lightness of image pixel 313 is above the low threshold 620, the resulting pixel 513 is set at a lightness of the greater of: the low threshold 620, and the lightness of image pixel 313 minus a predetermined value. In this example the predetermined value is delta lightness 610, i.e. the difference between high lightness threshold 630 and low lightness threshold 620. In this case, the lightness of the image pixel 313 minus delta lightness 610 is greater than the low threshold 620, and the lightness of image pixel 313 is thus decreased by delta lightness 610 to give the modified lightness of the combination pixel 513. In other words, in this example a maximum difference between the lightness of an image pixel and the lightness of a resulting combination pixel is set at a predetermined maximum value, delta lightness 610. In other examples, the predetermined maximum value may be set independently of the high threshold 630 and the low threshold 620. For example, the predetermined maximum value may be determined to define a maximum contrast in lightness between adjacent pixels. The high threshold value 630, low threshold value 620, and the predetermined maximum value, may be chosen such that the resulting combination of graphic code and image has suitable readability by a device reads the resulting code. Furthermore, setting a predetermined maximum value as in the example method of FIG. 4 may allow the image to be more easily perceptible to a user viewing the resulting combination of image and graphic code.

Fourth image pixel 314 is white and is associated with fourth graphic code pixel 414. Therefore, in the example method, the lightness of fourth image pixel 414 is compared to the high threshold 630. It is determined that the lightness of fourth image pixel 314 is greater than the high threshold 630. The lightness of the fourth combination pixel 514 is therefore set to the lightness of the fourth image pixel 314.

Fifth image pixel 315 is associated with fifth graphic code pixel 415. Fifth graphic code pixel 415 is white. The lightness of fifth image pixel 515 is compared to the high lightness threshold 630 and is found to be less than high threshold 630. Furthermore, the difference between lightness of fifth image pixel 315 and the high threshold 630 is determined to be less than delta lightness 610. As such, the lightness of the fifth combination pixel 515 is set at the high threshold 630.

Sixth image pixel 316 is associated with sixth graphic code pixel 416. Sixth graphic code pixel 416 is white. The lightness of sixth image pixel 516 is compared to the high lightness threshold 630 and is found to be less than high threshold 630. The difference between sixth image pixel 316 and the high threshold 630 is found to be greater than delta lightness 610. As such, in the example of FIG. 3, the lightness of the sixth combined pixel 516 is set at a lightness value equal to the lightness of sixth image pixel 316 plus delta lightness 610. Similarly to as mentioned above, in other examples, where the lightness of an image pixel associated with a white graphic code pixel is found to be less than the high threshold, the lightness of the resulting combined pixel is set at the high threshold. For example, in such an example method, the lightness of the sixth combination pixel 516 may be set at the high threshold 630.

As described above, in implementing example methods described herein, lightness values of image pixels in HSL format are modified to produce modified pixels. The hue value, of the pixel is left unchanged. In some examples, an image pixel with an initially high lightness value may be associated with a black graphic code pixel. In such examples, according to example methods the lightness value of the image pixel is decreased, for example to the low lightness threshold or, in other examples, decreased by a maximum of delta lightness. In some examples, the hue of the pixel may be such that when the lightness of the pixel is decreased, a color of the pixel is exaggerated in terms of its perceptibility by a viewer. For example, a light pixel may appear off-white in the original image but have a red hue. When in this example the lightness is decreased, the pixel may appear bright red color, due to the red hue being exaggerated by the decrease in lightness. This effect may result in visible color artefacts in the resulting combined image and graphic code.

In example methods, the above-described color artefacts are reduced by modifying the saturation value of a pixel based on the lightness value of the pixel. For example, for an image pixel associated with a black graphic code pixel, a first predetermined lightness value may be set; if the lightness of the image pixel exceeds the first predetermined lightness value then the saturation value of the combined graphic code and image pixel produced by the method is reduced. For an image pixel associated with a white graphic code pixel, a second predetermined lightness value may be set; if the lightness of the image pixel is less than the second predetermined lightness value, then the saturation value of the combined graphic code and image pixel produced from the image pixel is reduced. In such examples, the saturation value may be reduced to a predetermined value, or may be reduced in a non-linear manner. In an example, the saturation value is reduced by dividing the original saturation value by a predetermined decay value. In examples, the first predetermined lightness value may be at or around 0.6, 0.7, 0.8 or 0.9. The second predetermined lightness value may be at or around, for example, 0.4, 0.3, 0.2, or 0.1. The decay value may be, for example, equal to 1.5, 2, 2.5, or 3.

To describe an example of a method comprising reduction of saturation as described above, in this example, the first predetermined lightness value is 0.6, the second predetermined lightness value is 0.4, and the decay value is 2. In the same example, the low threshold lightness value is 0.3 and the high threshold lightness value is 0.7. In this example, an image pixel having a lightness of 0.7 and a saturation value S is associated with a black graphic code pixel. According to the method, a combined image and graphic code pixel is produced by reducing the lightness of the image pixel from 0.7 to the low threshold 0.3. In this example, the image pixel lightness is greater than the first predetermined lightness of 0.6, and thus, the saturation of the combined image and graphic code pixel is S/(decay value)=S/2. As such, applying this example method, from an image pixel having a lightness 0.7 and saturation S and a black graphic code pixel, a combined image and graphic code pixel is produced having a lightness value 0.3 and a saturation value S/2. In examples, the hue value is left unaltered. In the same example method, an image pixel having a lightness of 0.3 and saturation S is associated with a white graphic code pixel. Since the lightness of the image pixel is less than 0.4, applying the example method to this pixel results in a combined image and graphic code pixel having a lightness value of 0.7 and saturation S/2.

Figure 5A:
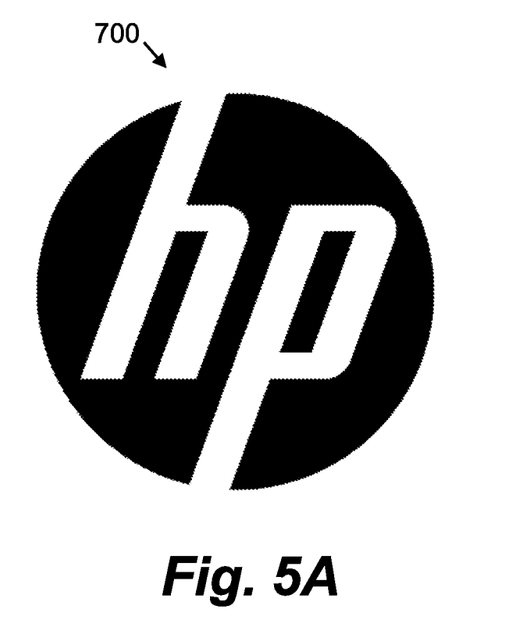
FIG. 5A shows an example image to be combined with an example machine readable graphic code.

FIG. 5A shows a representation of an example image 720 to be combined with the graphic code 710 in an example method described herein.

Figure 5B:
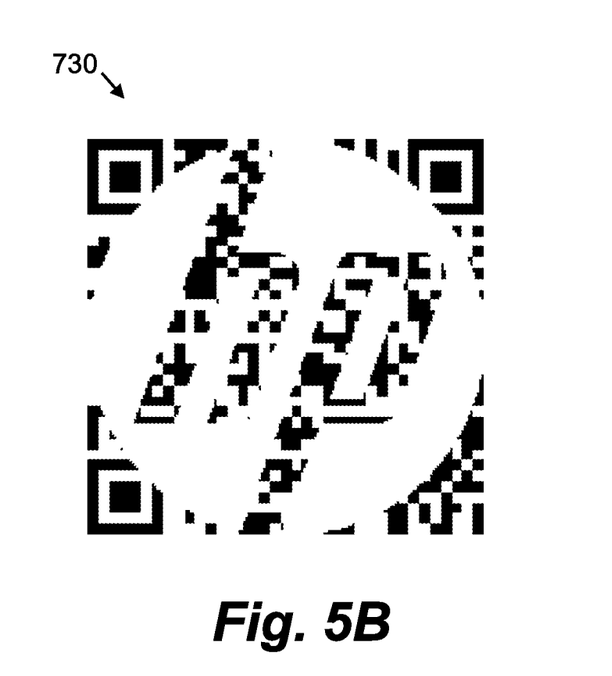
FIG. 5B shows a schematic representation of an example combination of the machine readable graphic code shown in FIG. 1B and the image shown in FIG. 5A.

FIG. 5B shows a schematic representation of an example combination 730 of the image 720 with the machine readable graphic code 120 of FIG. 1B, wherein the combination 730 is produced according to an example method described herein. It should be noted that FIG. 5B is a schematic representation shown in black and white and thus does not show pixel values which may be present in a combination graphic code and image produced according to a method described herein. For example, the combination of the graphic code and the image in FIG. 5B does not the degrees of lightness, and/or other pixel parameters, such as RGB values, or hue and saturation values, which are produced by example methods described herein and, for example, does not show a portion of the areas corresponding to dark areas of the graphic code which would be visible in a combination produced according to methods described herein.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:
1. A method for generating a combination image having a plurality of combination pixels, the method comprising:
providing, to a processor, or generating by the processor, an image comprising a plurality of image pixels;
providing, to the processor, or generating by the processor, a machine readable graphic code comprising a plurality of graphic code pixels, each graphic code pixel being light or dark;
determining, using the processor, if the image is of a same size as the graphic code, and if the image is not of the same size as the graphic code, scaling or cropping the image or the graphic code to make the image the same size as the graphic code, wherein after scaling or cropping, the graphic code pixels and the image pixels correspond to the combination pixels such that each combination pixel has a corresponding graphic code pixel and a corresponding image pixel;
initially setting, by the processor, a lightness of each combination pixel to a lightness of the corresponding image pixel;
determining, by the processor, whether to adjust the lightness of each combination pixel based on a comparison between the lightness of the corresponding image pixel and a lightness of the corresponding graphic code pixel in relation to either or both of a low threshold lightness value and a high threshold lightness value; and
adjusting, by the processor, the lightness of each combination pixel to be adjusted to a modified lightness.

2. The method according to claim 1, wherein determining whether to adjust the lightness of each combination pixel pixel comprises:
associating the low lightness threshold value with the graphic code pixels that are dark and associating the high lightness threshold value with the graphic code pixels that are light;
for each combination pixel for which the corresponding graphic code pixel is dark, adjusting the lightness of the combination pixel or leaving the lightness of the combination pixel unchanged based on a comparison between the lightness of the corresponding image pixel and the low lightness threshold value; and
for each combination pixel for which the corresponding graphic code pixel is light, adjusting the lightness of the combination pixel or leaving the lightness of the combination pixel unchanged based on a comparison between the lightness of the corresponding image pixel and the high lightness threshold value.

3. The method according to claim 2,
wherein, for each combination pixel for which the corresponding graphic code pixel is light, adjusting the lightness of the combination pixel or leaving the lightness of the combination pixel unchanged comprises:
if the lightness of the corresponding image pixel is greater than or equal to the high threshold lightness value, leaving the lightness of the combination pixel unchanged; and
if the lightness of the corresponding image pixel is less than the high threshold lightness value, increasing the lightness of the combination pixel to a modified lightness,
and wherein, for each combination pixel for which the corresponding graphic code pixel is dark, adjusting the lightness of the combination pixel or leaving the lightness of the combination pixel unchanged comprises:
if the lightness of the corresponding image pixel is less than or equal to the low threshold lightness value, leaving the lightness of the combination pixel unchanged, and if the lightness of the corresponding image pixel is greater than the low threshold lightness value, decreasing the lightness of the combination pixel to a modified lightness.

4. The method according to claim 3, wherein adjusting the lightness of each combination pixel to be adjusted comprises:
if the corresponding graphic code pixel is light, adjusting the lightness of the combination pixel to the high threshold lightness value; and
if the corresponding graphic code pixel is dark, adjusting the lightness of the combination pixel to the low threshold lightness value.

5. The method according to claim 3, wherein adjusting the lightness of each combination pixel to be adjusted comprises:
if the corresponding graphic code pixel is light, adjusting the lightness of the combination pixel towards the high threshold lightness value by a lesser of: a difference between the lightness of the corresponding image pixel and the high threshold lightness value, and a first predetermined value; and
if the corresponding graphic code pixel is dark, adjusting the lightness of the combination pixel towards the low threshold light values by a lesser of: a difference between the lightness of the corresponding image pixel and the low threshold lightness value, and a second predetermined value.

6. The method according to claim 5,
wherein for each combination pixel to be adjusted for which the corresponding graphic code pixel is light, adjusting the lightness of the combination pixel comprises increasing the lightness of combination pixel to a lesser of:
the high lightness threshold value; and
the lightness of the corresponding image pixel plus the first predetermined value,
and wherein for each combination pixel to be adjusted for which the corresponding graphic code pixel is dark, adjusting the lightness of the combination pixel comprises decreasing the lightness value of the combination pixel to a greater of:
the low lightness threshold value; and
the lightness of the corresponding image pixel minus the second predetermined value.

7. The method according to claim 6, wherein each of the first and the predetermined values is a difference between the high lightness threshold value and the low lightness threshold value.

8. The method according to claim 1, wherein the machine readable graphic code is a two-dimensional code, or a one-dimensional code.

9. The method according to claim 1 wherein the lightness of each combination pixel has a range of possible values between 0 and 1, the high threshold lightness value is between 0.6 and 0.8, and the low threshold lightness value is between 0.2 and 0.4.

10. The method according to claim 1 wherein the format comprising a lightness value is HSL format, comprising values hue, saturation, and lightness.

11. The method according to claim 10, further comprising determining and applying a modification to a saturation of each combination pixel based on the lightness of the combination pixel.

12. The method according to claim 11, further comprising determining whether to modify the saturation of each combination pixel based on a magnitude of a modification made to the lightness of the combination pixel.

13. The method according to claim 12, wherein the modification to the saturation of each combination pixel comprises dividing the saturation of the combination pixel by a predetermined decay value.

14. A method for generating a combination image having a plurality of combination pixels, the method comprising, at a processor:
providing to the processor, or generating by the processor, an image comprising a plurality of image pixels, the combination pixels corresponding to the image pixels;
providing to the processor, or generating by the processor, a machine readable graphic code comprising a plurality of graphic code pixels that are each light or dark, each combination pixel having a corresponding graphic code pixel;
initially setting a lightness of each combination pixel to a lightness of the corresponding image pixel;
determining whether to adjust the lightness of each combination pixel based on a comparison between the lightness of the corresponding image pixel and a lightness of the corresponding graphic code pixel in relation to either or both of a low threshold lightness value and a high threshold lightness value; and
adjusting the lightness of each combination pixel to be adjusted to a modified lightness.

15. A non-transitory computer readable medium storing a set of instructions executable by a processor to perform processing for generating a combination image having a plurality combination pixels, the processing comprising:
receiving or generating an image comprising a plurality of image pixels;
receiving or generating a machine readable graphic code comprising a plurality of graphic code pixels that are each light or dark, the combination pixels corresponding to the graphic code pixels, each combination pixel having a corresponding image pixel;
initially setting a lightness of each combination pixel to a lightness of the corresponding image pixel;
determine whether to adjust the lightness of each combination pixel based on a comparison between the lightness of the corresponding image pixel and a lightness of the corresponding graphic code pixel in relation to either or both of a low threshold lightness value and a high threshold lightness value; and
adjusting the lightness of each combination pixel to be adjusted to a modified lightness.

* * * * *